(12) United States Patent
Choi et al.

(10) Patent No.: US 10,642,024 B2
(45) Date of Patent: May 5, 2020

(54) FLUID FOR ELECTROWETTING DEVICE AND ELECTROWETTING DEVICE USING THE SAME

(71) Applicants: SAMSUNG ELECTRONICS CO., LTD., Suwon-si (KR); SNU R&DB FOUNDATION, Seoul (KR)

(72) Inventors: Kyuhwan Choi, Yongin-si (KR); Jungmok Bae, Seoul (KR); Yongjoo Kwon, Yongin-si (KR); Yunhee Kim, Seoul (KR); Taekdong Chung, Seoul (KR); Yoonsun Choi, Yongin-si (KR)

(73) Assignees: SAMSUNG ELECTRONICS CO., LTD., Suwon-si (KR); SNU R&DB FOUNDATION, Seoul (KR)

( * ) Notice: Subject to any disclaimer, the term of this patent is extended or adjusted under 35 U.S.C. 154(b) by 62 days.

(21) Appl. No.: 14/671,171

(22) Filed: Mar. 27, 2015

(65) Prior Publication Data

US 2015/0338636 A1     Nov. 26, 2015

(30) Foreign Application Priority Data

May 22, 2014   (KR) .................. 10-2014-0061793

(51) Int. Cl.
  *G02B 26/00*   (2006.01)
  *G02B 26/08*   (2006.01)
  *G02F 1/29*    (2006.01)
(52) U.S. Cl.
  CPC ................................ *G02B 26/005* (2013.01)

(58) Field of Classification Search
  USPC .............. 359/237, 242, 245, 250, 253, 254, 359/290–292, 295, 296, 298
  See application file for complete search history.

(56) References Cited

U.S. PATENT DOCUMENTS

| 7,585,428 | B1* | 9/2009 | Marshall ................ H01G 9/035 252/62.2 |
| 7,780,874 | B2 | 8/2010 | Liogier D'Ardhuy et al. |
| 8,199,409 | B2 | 6/2012 | Hayes et al. |
| 8,520,286 | B2* | 8/2013 | Clapp .................. G02B 26/005 359/270 |
| 8,717,663 | B2 | 5/2014 | Heikenfeld et al. |
| 8,854,739 | B2 | 10/2014 | Kuiper et al. |
| 2004/0137736 | A1* | 7/2004 | Daviot .................... C11D 7/06 438/690 |

(Continued)

FOREIGN PATENT DOCUMENTS

| JP | 2013014746 A | 1/2013 |
| KR | 10-2012-0089258 A | 8/2012 |
| KR | 10-2012-0093260 A | 8/2012 |

OTHER PUBLICATIONS

A. Schultz, et al., "Detailed Analysis of Defect Reduction in Electrowetting Dielectrics Through a Two-Layer 'Barrier' Approach", Thin Slid Films, vol. 534, May 1, 2013, p. 348-355, URL: http://dx.doi.org/10.1016/j.tsf.2013.03.008.

*Primary Examiner* — Brandi N Thomas
(74) *Attorney, Agent, or Firm* — Sughrue Mion, PLLC (57) ABSTRACT

An electrowetting device which includes a polarizable liquid; and a nonpolar solution separated from the polarizable liquid by an interface. The polarizable liquid may include a polar solvent, an organic acid, and ammonium hydroxide having at least one alkyl group.

14 Claims, 9 Drawing Sheets

(56) References Cited

U.S. PATENT DOCUMENTS

| | | | |
|---|---|---|---|
| 2006/0001726 A1* | 1/2006 | Kodas | C23C 18/06 347/105 |
| 2009/0203566 A1* | 8/2009 | Lee | G03F 7/425 510/175 |
| 2012/0092753 A1* | 4/2012 | Heikenfeld | G02B 26/005 359/296 |
| 2014/0240645 A1* | 8/2014 | Shim | H01L 27/3258 349/86 |

* cited by examiner

FLUID FOR ELECTROWETTING DEVICE AND ELECTROWETTING DEVICE USING THE SAME

CROSS-REFERENCE TO THE RELATED APPLICATION

This application claims the benefit under 35 U.S.C. § 119(a) of Korean Patent Application No. 10-2014-0061793, filed on May 22, 2014, in the Korean Intellectual Property Office, the disclosure of which is incorporated herein in its entirety by reference.

BACKGROUND

Field

The present disclosure relates to fluids for electrowetting devices and electrowetting devices using the same.

Description of Related Art

Electrowetting devices are devices that can be used in active optical elements (AOE) required to realize three-dimensional (3D) stereoscopic images.

In the realization of the 3D stereoscopic images, electrowetting devices may change a path of light emitted from a light source to an observer.

Electrowetting devices may include two fluid layers which are not mixed with each other. The electrowetting devices are capable of controlling the proceeding path of light by changing a potential difference between the two fluid layers in order to adjust a contact angle of the fluid layers.

Electrowetting devices that are used in optical elements may have micropatterned shapes, wherein reliability of the electrowetting devices may be reduced due to diffusion of constituents of the fluid layers since relatively high electric potential gradients are formed on boundary surfaces of the fluid layers and electrodes (dielectric films).

SUMMARY

One or more exemplary embodiments provide fluids for electrowetting devices capable of increasing reliability of the electrowetting devices.

One or more exemplary embodiments provide highly reliable electrowetting devices using the fluids.

Additional aspects will be set forth in part in the description which follows and, in part, will be apparent from the description, or may be learned by practice of the presented embodiments.

According to an aspect of the present disclosure, an electrowetting device may include: a first fluid that is a polarizable liquid; and a second fluid that is a nonpolar solution, separated from the first fluid by an interface. The first fluid may include a polar solvent, an organic acid, and ammonium hydroxide having at least one alkyl group.

The polar solvent may include ethylene glycol (EG), 1,2-propylene glycol, 1,3-propylene glycol, diethylene glycol, propylene carbonate, diethyl carbonate, gamma-butyrolactone (GBL), dimethylformamide (DMF), N-methylpyrrolidone (NMP), or mixtures thereof.

The organic acid may include acetic acid, propionic acid, acrylic acid, lactic acid, isobutyric acid, tartaric acid, citric acid, cresol, phenol, polyacetic acid, polyacrylic acid, or derivatives thereof.

Examples of ammonium hydroxide having the at least one alkyl group may include tetramethylammonium hydroxide, tetraethylammonium hydroxide, triethylmethylammonium hydroxide, diethyldimethylammonium hydroxide, ethyltrimethylammonium hydroxide, trimethylphenylammonium hydroxide, and mixtures thereof.

The second fluid may include oil.

An amount of the organic acid may be about 0.1% by weight to about 10% by weight with respect to the total weight of the first fluid.

A weight ratio of the ammonium hydroxide having the at least one alkyl group to the organic acid may be about 0.8 to about 1.2.

The first fluid may have an electrical conductivity of about 10 µS/cm to about 10,000 µS/cm.

The first fluid may have a freezing point of about −5° C. to about −100° C.

The first fluid may have a surface tension of about 6 mN/m to about 12 mN/m.

The first fluid may have a surface tension change ratio of about 50% to about 200% according to content changes of the organic acid and the ammonium hydroxide.

According to another aspect of the present disclosure, an electrowetting device includes: a first electrode and a second electrode facing each other; a dielectric film formed on the first electrode and the second electrode; and a fluid for electrowetting which is disposed between the first electrode and the second electrode and separated from the first electrode and the second electrode by the dielectric film.

The dielectric film may include silicon oxide, silicon nitride, alumina, or perylene.

The first fluid and the second fluid may have a contact angle of about 20° to about 160° therebetween.

BRIEF DESCRIPTION OF THE DRAWINGS

The above and/or other aspects will be more apparent from the following detailed description, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present disclosure. Expressions such as "at least one of," when preceding a list of elements, modify the entire list of elements and do not modify the individual elements of the list.

Hereinafter, a fluid for electrowetting according to an exemplary embodiment of the present disclosure will be described in detail.

A fluid for electrowetting according to an exemplary embodiment of the present disclosure includes a first fluid that is a polarizable liquid, and a second fluid that is a nonpolar solution. The first and second fluids are separated from each other by an interface between the first and second fluids. The first fluid includes a polar solvent, an organic acid, and ammonium hydroxide having at least one alkyl group.

For example, the polar solvent may include polyols, amides, polypyrroles, molten salts, mixtures thereof, or mixtures thereof with water.

For example, the polar solvent may include ethylene glycol, 1,2-propylene glycol, 1,3-propylene glycol, diethylene glycol, propylene carbonate, diethyl carbonate, gamma-butyrolactone (GBL), dimethylformamide (DMF), N-methylpyrrolidone (NMP), mixtures thereof, or mixtures thereof with water.

The polar solvent may have a freezing point lower than that of water. For example, the polar solvent may have a freezing point within a range of −100° C. to −5° C. A usable temperature range of the electrowetting device is greatly dependent on the freezing point of the fluid since an electrowetting device cannot operate once the fluid solidifies. Decreasing the freezing point of the polar solvent increases the temperature range in which the electrowetting device can operate.

The organic acid may be an aliphatic organic acid or an aromatic organic acid.

For example, the organic acid may include acetic acid, propionic acid, acrylic acid, lactic acid, isobutyric acid, tartaric acid, citric acid, cresol, phenol, polyacetic acid, polyacrylic acid, or derivatives thereof. The organic acid may increase electrical conductivity of the first fluid. Further, the organic acid may benefit the stability of the device since there is a low extent to which organic ions of the organic acid are diffused to other parts of the electrowetting device, compared to inorganic ions of a monoatom. The amount of organic acid may be about 0.1% by weight to about 10% by weight with respect to the total weight of the first fluid. When the amount of the organic acid contained in the first fluid is in the above-mentioned range, the first fluid may maintain an appropriate electrical conductivity, and surface tension of the first fluid may not be affected.

The alkyl group of ammonium hydroxide having the at least one alkyl group may be a straight-chain or branched-chain alkyl group having 3 to 10 carbon atoms.

Examples of ammonium hydroxide having the at least one alkyl group may include tetramethylammonium hydroxide, tetraethylammonium hydroxide, triethylmethylammonium hydroxide, diethyldimethylammonium hydroxide, ethyltrimethylammonium hydroxide, trimethylphenylammonium hydroxide, and mixtures thereof.

Hydroxide ions (OH−) produced from ammonium hydroxide are combined with hydrogen ions (H+) generated from the organic acid to produce water such that a leakage current of an electrowetting device due to diffusion of hydrogen ions (H+) into other parts can be reduced. Since ammonium hydroxide ions instead of hydrogen ions (H+) function as an electrolyte, electrical conductivity of the first fluid may be maintained. Further, since sizes of ammonium hydroxide ions having functional group are much larger than those of hydrogen ions (H+), a leakage current due to diffusion of ammonium hydroxide ions is not generated.

The weight ratio of ammonium hydroxide to the organic acid may be about 0.8 to about 1.2.

When the amount of ammonium hydroxide is in the above-mentioned range, an appropriate electrical conductivity without a leakage current may be maintained.

A surface tension change of the first fluid according to content changes of the organic acid and ammonium hydroxide may have a ratio between about 50% and about 200%. When a surface tension of the first fluid with a weight content ratio of 1 is a reference value, a surface tension change range may be about 50% to about 200% with respect to the reference value when contents of the organic acid and ammonium hydroxide are changed in the above-mentioned range.

The first fluid may have an electrical conductivity range of about 10 μS/cm to about 10,000 μS/cm. The first fluid has the electrical conductivity range such that movements of the fluid with respect to a voltage applied can be controlled. The first fluid may have a surface tension range of about 6 mN/m to about 12 mN/m. On the other hand, since the first fluid has a small surface tension change according to content changes of the organic acid and ammonium hydroxide, the contents of the organic acid and ammonium hydroxide that can be adjusted to control electrical conductivity of the first fluid have wide margins.

Examples of the second fluid may include oils such as bromonaphthalene, chloronaphthalene, bromododecane, tetradecane, and mixtures thereof, but the examples of the second fluid are not limited thereto. The second fluid is nonconductive and has an electrical conductivity of less than 0.001 μS/cm.

The first fluid and the second fluid can increase stability of an electrowetting device since the fluids do not chemically react with solids. Further, the first fluid and the second fluid can increase stability of the device since components of the fluids are not diffused into other parts of the device.

The first fluid and the second fluid may have a viscosity range of more than about 0 cP to about 10 cP. When the viscosity range is maintained in the above range, the electrowetting device may have good characteristics. The first fluid and the second fluid may have a light transmittance value range of about 90% to about 100%. When the light transmittance value range is maintained in the above range, the fluids may be used in an optical device while minimizing optical loss. On the other hand, the first fluid and the second fluid may have a boiling point range of higher than about 80° C. When the boiling point range is maintained, stability of the device in which the first fluid is used can be increased. The first fluid and the second fluid may have electrical stabilities when an absolute voltage value of about 100 V or less is applied to the first and second fluids.

The first fluid to the second fluid density ratio may be within a range of about 0.8 to about 1.2. When the density ratio range is maintained, the electrowetting device may have good characteristics. The first fluid and the second fluid may have a wide contact angle of about 0° to about 170°. For example, a contact angle between the first fluid and the second fluid may be varied within a range of about 20° to about 160°.

Electrowetting Prism Cell

Figure 1:
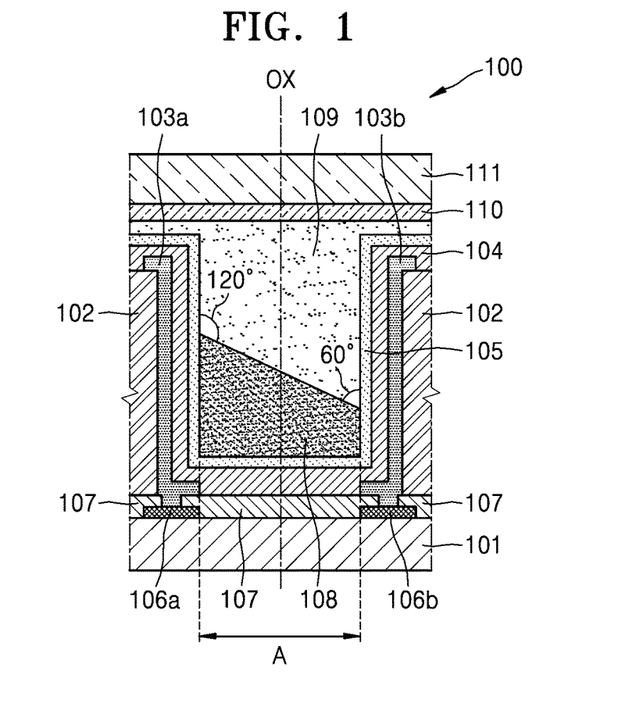
FIG. 1 is a cross-sectional view schematically illustrating a structure of a prism cell of an electrowetting prism device according to an exemplary embodiment.

FIG. 1 schematically illustrates a cross-sectional view of the structure of a prism cell of an electrowetting prism device according to an exemplary embodiment.

Referring to FIG. 1, an electrowetting prism cell 100 may include a bottom substrate 101 and a top substrate 111 disposed opposite to each other, a partition 102 on the bottom substrate 101, a first electrode 103a and a second electrode 103b respectively disposed on side walls of the partition 102, a dielectric film 104 which completely cover the first and second electrodes 103a and 103b, a hydrophobic coating 105 which completely covers the dielectric film 104, first and second wirings 106a and 106b arranged on the top surface of the bottom substrate 101 such that the first and second wirings are electrically connected to the first and second electrodes 103a and 103b respectively, a passivation layer 107, a common electrode 110 disposed on the bottom surface of the top substrate 111, and a nonpolar liquid 108 and a polarizable liquid 109 disposed within a space surrounded by the partition 102.

The bottom substrate 101 and the top substrate 111 may be made of transparent materials through which light is capable of being transmitted. For example, the bottom substrate 101 and the top substrate 111 may be made of materials such as transparent glass, plastics, etc.

For example, the partition 102 divides the prism cell 100, and the partition 102 may be formed by patterning photoresists, silicon oxides, silicon nitrides, etc. Although FIG. 1 is illustrated in such a way that two of the partitions 102 are disposed in the cross-sectional view of FIG. 1, the partitions 102 may actually be constructed in a mesh form such that a plurality of small spaces are formed within the partitions. As illustrated in FIG. 1, the first electrode 103a and the second electrode 103b may be disposed opposite to each other with a space being formed between the first electrode 103a and the second electrode 103b by the partition 102.

The first electrode 103a and the second electrode 103b may be made of transparent conductive materials. Examples of the transparent conductive materials of the first electrode 103a and the second electrode 103b may include conductive metal oxides such as Indium Tin Oxide (ITO), ZnO:Al, ZnO:Ga and SnO2:F, conductive polymers, and carbon nanotubes (CNT). However, the transparent conductive materials of the first electrode 103a and the second electrode 103b are not limited to these examples.

Figure 2A:
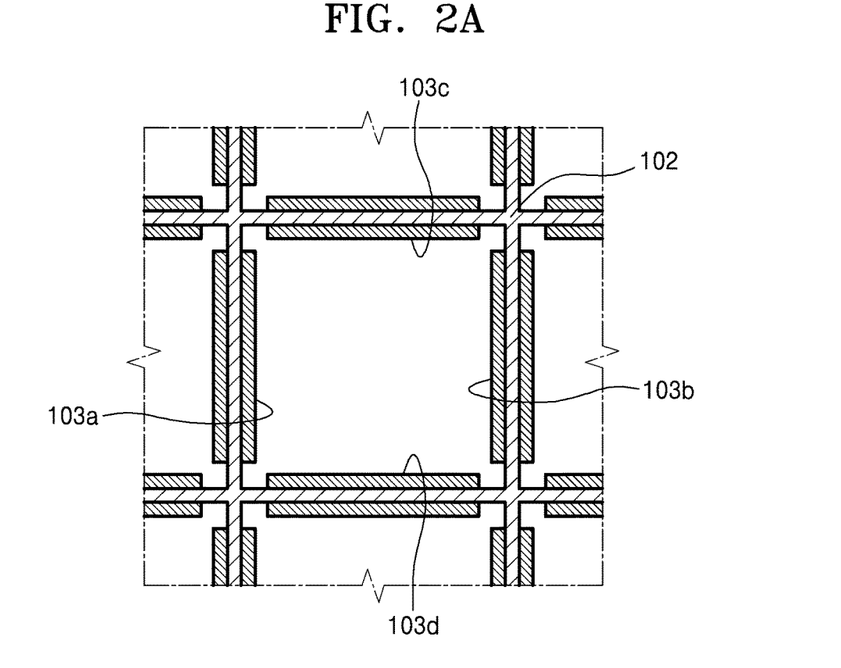
FIG. 2A is a conceptual diagram schematically showing an arrangement of a prism cell according to an exemplary embodiment.

FIG. 2A schematically illustrates the arrangement of a prism cell 100 according to an exemplary embodiment of the present disclosure. Referring to FIG. 2A, the partition 102 may be formed in a mesh form such that a plurality of spaces having a rhombus shape are formed along the arrangement of the prism cell 100, and the electrodes 103a and 103b may be disposed in each of the spaces. For example, the first electrode 103a may be disposed across two adjacent side walls located at the left side of the partition 102, and the second electrode 103b may be disposed across the other two adjacent side walls located at the right side of the partition 102 such that the second electrode is orientated in an opposite direction to the first electrode. Therefore, for example, a central portion of the first electrode 103a may be bent into a "<" shape, and a central portion of the second electrode 103b may be bent into a ">" shape.

Figure 2B:
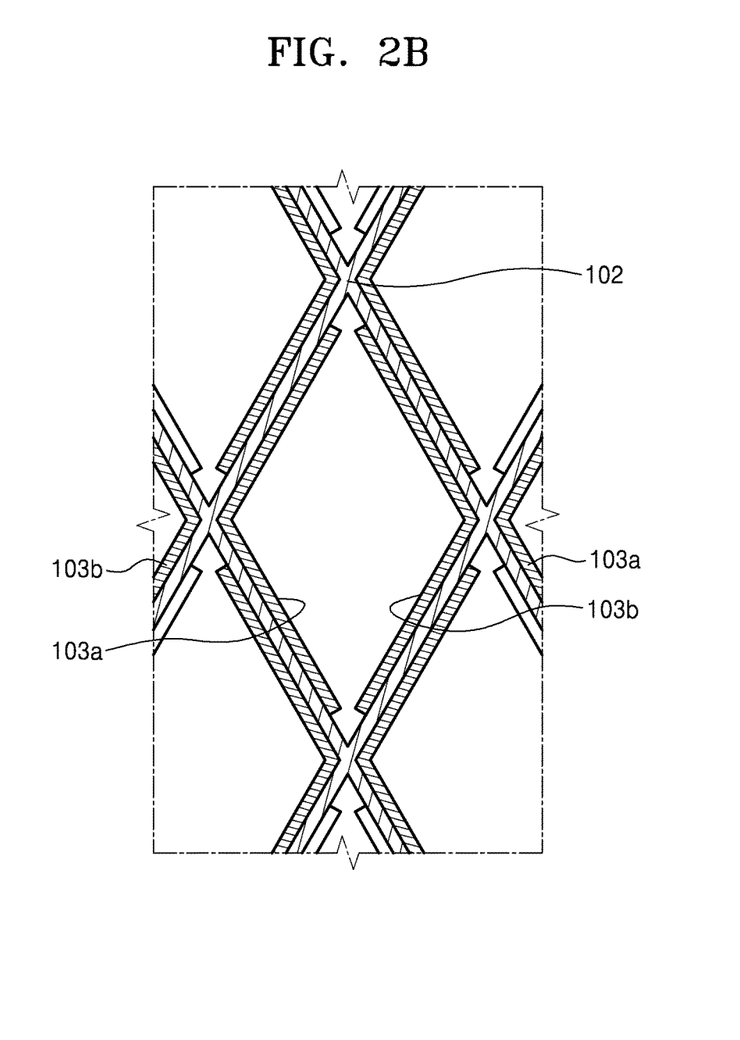
FIG. 2B is a conceptual diagram schematically showing an arrangement of a prism cell according to another exemplary embodiment.

On the other hand, a plane of the prism cell 100 may have various shapes such as a rectangular shape, etc in addition to a rhombus shape, wherein the first and second electrodes 103a and 103b are not bent, but may be separated. FIG. 2B is a conceptual diagram schematically showing the arrangement of a prism cell 100 according to another exemplary embodiment of the present disclosure. As illustrated in FIG. 2B, the partition 102 may have a mesh shape to form a plurality of rectangular-shaped spaces, and four electrodes 103a to 103d may be respectively disposed in each of the spaces. That is, the first electrode 103a and the second electrode 103b are disposed on the partition 102 along a first direction, and the third electrode 103c and the fourth electrode 103d may be respectively disposed on the partition 102 along a second direction perpendicular to the first direction.

The dielectric film 104 plays a role of electrically insulating the first and second electrodes 103a and 103b and liquids 108 and 109 in the spaces. Although the dielectric film 104 may be formed of silicon oxides, silicon nitrides, alumina, perylene, etc, the dielectric film 104 is not limited thereto. The dielectric film 104 may be formed such that the dielectric film is extended to the bottom within the spaces while completely covering the first and second electrodes 103a and 103b. Further, the hydrophobic coating 105 formed along the surface of the dielectric film 104 may enable the polarizable liquid 109 to easily form a predetermined contact angle on an interface of the polarizable liquid 109 and the nonpolar liquid 108.

Although the hydrophobic coating 105 may include poly(tetrafluoroethylene), poly(trifluoroethylene), and poly(difluoroethylene), the hydrophobic coating 105 is not limited to these examples. The hydrophobic coating 105 may also be formed such that the hydrophobic coating 105 is extended to the bottom within the spaces while completely covering the dielectric film 104.

Figure 3:
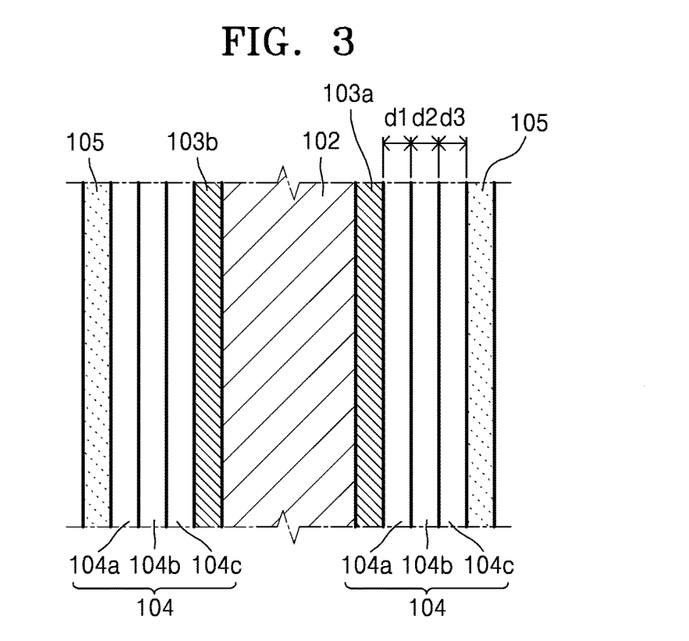
FIG. 3 is a cross-sectional view schematically showing an illustrative multilayered structure of a dielectric film.

In order to endure various pressures caused by shaking of the liquids 108 and 109, and also to prevent chemical reactions with the liquids 108 and 109, the dielectric film 104 may comprise multiple layers of different materials. For example, FIG. 3 is a cross-sectional view schematically illustrating an exemplary multilayered structure of the dielectric film 104. Referring to FIG. 3, for example, the dielectric film 104 may include a first layer 104a formed from amorphous fluoropolymer such as CYTOP, a second layer 104b formed from HfO2, and a third layer 104c formed from Mo. Furthermore, the first layer 104a may have a thickness d1 of about 100 Å, the second layer 104b may have a thickness d2 of about 2,000 Å, and the third layer 104c may have a thickness d3 of about 2,000 Å, although the thicknesses of the first, second and third layers are not limited thereto.

The fluid for electrowetting disposed within the spaces formed by the partition 102 may include fluids for electrowetting according to exemplary embodiments of the present disclosure. The fluid for electrowetting may include a nonpolar liquid 108 and a polarizable liquid 109 as described above.

The nonpolar liquid 108 and the polarizable liquid 109 may have high transmittance values such that light can pass through the nonpolar liquid 108 and the polarizable liquid 109 with little loss of light. Also, the nonpolar liquid 108 and the polarizable liquid 109 may have refractive indexes that are different from each other such that light can be deflected from an interface between the nonpolar liquid 108 and the polarizable liquid 109. Further, as illustrated in FIG. 1, the nonpolar liquid 108 may have a higher density than the polarizable liquid 109 allowing the nonpolar liquid 108 to be disposed at the bottom side within the spaces.

Further, as illustrated in FIG. 1, the nonpolar liquid 108 located at the bottom side within the spaces formed by the partition 102 may be separately disposed in each of the electrowetting prism cells 100. On the other hand, the polarizable liquid 109 disposed at the top side of the spaces may be disposed such that the polarizable liquid 109 is uniformly extended across all electrowetting prism cells 100 within the electrowetting prism device. For this, a predetermined gap may exist between the bottom surface of the transparent top substrate 111 and the top surface of the partition 102.

The passivation layer 107 may be formed on the wirings 106a and 106b such that the wirings 106a and 106b are brought into contact with the electrodes 103a and 103b only. The passivation layer 107 may be formed such that the wirings 106a and 106b are covered by the passivation layer 107 except for parts of the passivation layer 107 connected to the electrodes 103a and 103b. In this case, the partition 102, the electrodes 103a and 103b, and the dielectric film 104 may be formed on the passivation layer 107.

In an exemplary electrowetting prism cell 100 having the above-described structure, a contact angle between the partition 102 and an interface of the polarizable liquid 109 and the nonpolar liquid 108 may be controlled by a voltage applied to the two electrodes, 103a and 103b, respectively. Therefore, the voltages applied to the electrodes 103a and 103b may be appropriately controlled, such that the interface of the polarizable liquid 109 and the nonpolar liquid 108 may be inclined or perpendicular to an optical axis. For example, a predetermined voltage may be applied to the first electrode 103a such that the interface forms a contact angle of about 120° at the left side of the partition 102, and a predetermined voltage may be applied to the second electrode 103b such that the interface forms a contact angle of about 60° at the right side of the partition 102. Then, the interface of the polarizable liquid 109 and the nonpolar liquid 108 may be inclined to an angle of about 60° with respect to the optical axis OX as illustrated in FIG. 1. According to such a principle, the electrowetting prism cell 100 deflects incident light to a desired angle such that a proceeding direction of the incident light can be changed as a function of applied voltages.

An electrowetting prism device according to exemplary embodiments may include a plurality of the above-described electrowetting prism cells 100 that are two-dimensionally arranged in a rhombic lattice form as illustrated in FIG. 2. In such an electrowetting prism device, all of the electrowetting prism cells 100 may be operated in accordance with each other. Alternatively, each of the electrowetting prism cells 100 may be operated independently. That is, inclined angles of the interface may be identically operated in all of the electrowetting prism cells 100, or the inclined angles of the interface may be operated differently from one another in each of the electrowetting prism cells 100. When all of the electrowetting prism cells 100 within the electrowetting prism device are operated in accordance with each other, the wirings 106a and 106b may be directly connected to the electrodes 103a and 103b. For example, the first wiring 106a may be directly connected to the first electrode 103a, and the second wiring 106b may be directly connected to the second electrode 103b. Meanwhile, when each of the electrowetting prism cells 100 within the electrowetting prism device is independently operated, a switching element may be disposed in each of the electrowetting prism cells 100.

When such an electrowetting prism device is employed in a three-dimensional (3D) image display device, the 3D image display device may have improved luminance, and power consumption may be reduced.

Figure 4:
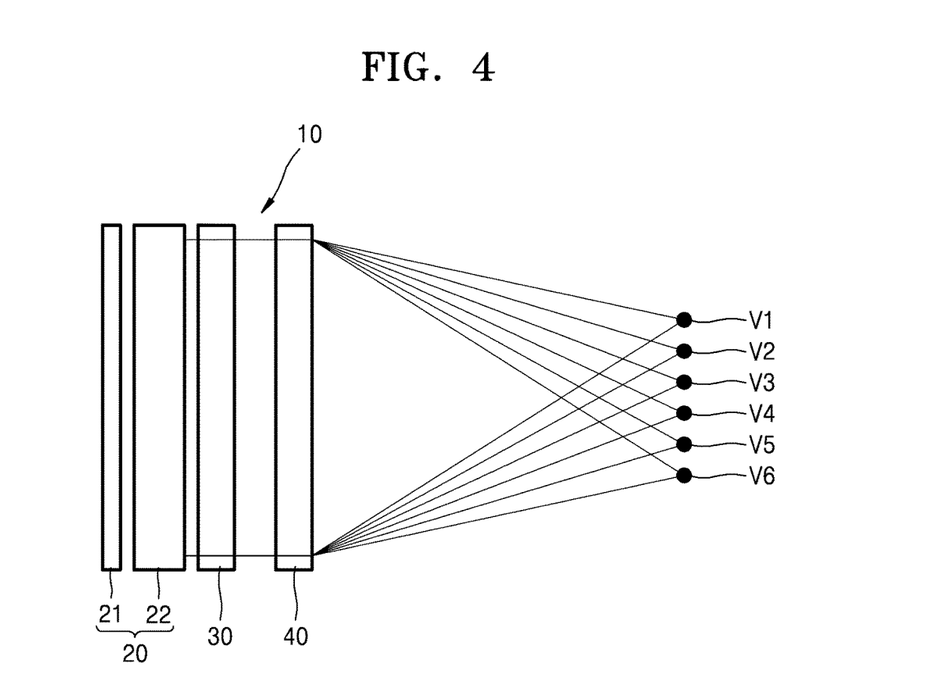
FIG. 4 is a conceptual diagram schematically illustrating a structure of a multiview three-dimensional (3D) image display device including the electrowetting prism device according to an exemplary embodiment.

FIG. 4 is a conceptual diagram schematically showing the structure of an exemplary multiview 3D image display device including the above-mentioned electrowetting prism device according to an embodiment of the present disclosure.

As illustrated in FIG. 4, a 3D display device 10 according to the present disclosure may include an image generation part 20 which is configured to generate images, and an electrowetting prism device 40 which is configured to change a proceeding path of light from the image generation part 20. Additionally, the 3D display device 10 may optionally include a 3D optical part 30 which is configured to separate a view point between the image generation part 20 and the electrowetting prism device 40.

The image generation part 20 may include a light source 21, and a display panel 22 configured to form images using light from the light source 21. Examples of the display panel 22 may include a liquid crystal display (LCD), a digital micromirror device, a liquid crystal on silicon (LCOS) display, and a spatial light modulator (SLM).

Although FIG. 4 illustrates the image generation part 20 including a separate light source 21, the light source is only one exemplary component of the image generation part 20, and in other exemplary embodiments, the light source 21 is not required. For example, the image generation part 20 may include a self-light emitting display panel, such as an organic light emitting diode (OLED) or a plasma display panel (PDP), which does not require a separate light source.

The electrowetting prism device 40 plays a role of changing the proceeding path of light to form multiview points V1 to V6 from the view point of images. For example, the electrowetting prism device 40 may be comprised of an array of the above-described electrowetting prism cells 100, and may electrically control a refraction angle of light to provide images of multiple view points in a time sharing manner.

Figure 5A:
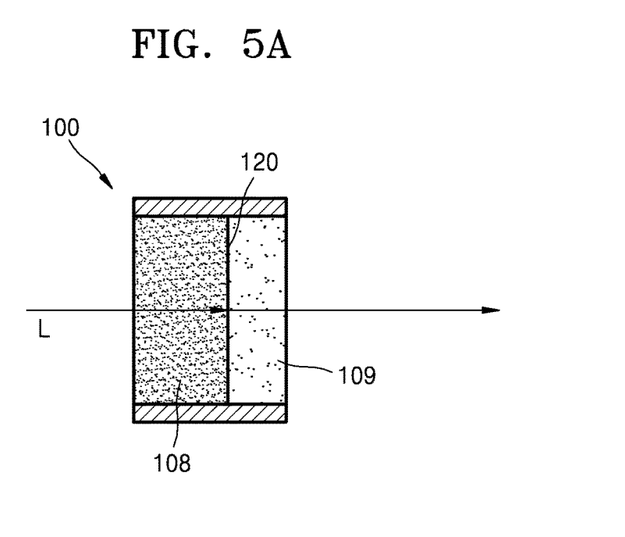
FIGS. 5A, 5B, 5C and 5D are conceptual diagrams illustrating movements of an exemplary prism cell and an exemplary layout of prism cells.
Figure 5B:
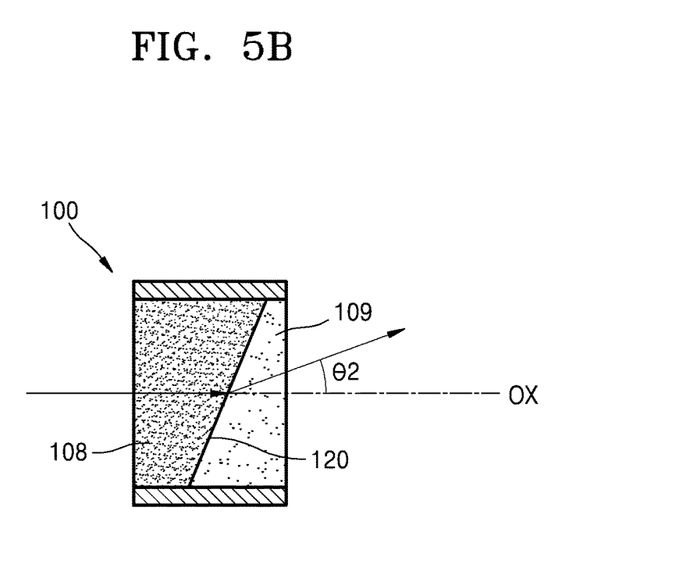
Figure 5C:
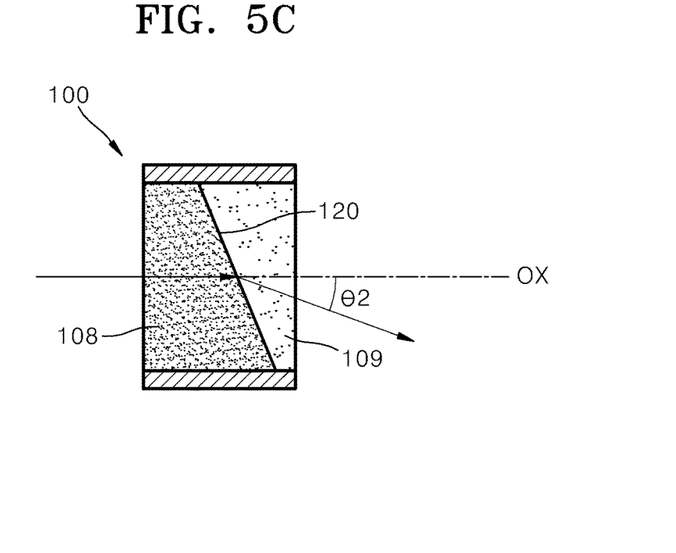

For example, when the interface 120 of the polarizable liquid 109 and the nonpolar liquid 108 is not inclined in the electrowetting prism cells 100 as illustrated in FIG. 5A, light L passes through the electrowetting prism cells 100 as is, without changing the proceeding path. Further, as illustrated in FIG. 5B, when the electrowetting prism cells 100 are electrically controlled to incline the interface 120 to a first angle, light is deflected by the interface 120 such that the deflected light passes through the electrowetting prism cells 100 at an angle of $+\theta 1$. When the electrowetting prism cells 100 are electrically controlled to incline the interface 120 to a second angle as illustrated in FIG. 5C, light is deflected by the interface 120 such that the deflected light passes through the electrowetting prism cells 100 at an angle of $-\theta 2$.

The image generation part 20 may generate images of view points that are time sequentially different from one another. A plurality of the electrowetting prism cells 100 within the electrowetting prism device 40 may be synchronized to the image generation part 20 and driven such that light including images of different view points is deflected to different angles.

For example, when an image of a first view point is output from the image generation part 20, the electrowetting prism cells 100 may be driven to enter a state in which the electrowetting prism cells 100 are not inclined as illustrated in FIG. 5A. Further, when an image of a second view point is output from the image generation part 20, the electrowetting prism cells 100 may be inclined to a first angle as illustrated in FIG. 5B. When an image of a third view point is output from the image generation part 20, the electrowetting prism cells 100 may be inclined to a second angle as illustrated in FIG. 5C. Images of many more view points may be displayed according to a driving speed of the electrowetting prism cells 100 and slope of the refractive surface.

For example, the 3D optical part 30 may separate viewing zones using optical elements such as a lenticular lens array, a microlens array, and a parallax barrier. Such a 3D optical part 30 may enable images output from the image generation part 20 to be separately focused on a plurality of viewing zones. According to the present embodiments, the number of view points can be increased by using both the 3D optical part 30, and the electrowetting prism device 40. For example, when the 3D optical part 30 separates images into two view points, and the electrowetting prism device 40 separates the images into three view points, images having a total of six view points may be displayed. Particularly, since the electrowetting prism device 40 can diversely control an angle of the interface using electrical signals, the electrowetting prism device 40 is used to greatly increase the number of view points. Moreover, since the electrowetting prism device 40 controls the optical path of the images generated in the image generation part 20 to change the view points, the number of view points can be increased without deteriorating resolution. Therefore, a 3D display device 10 according to the present disclosure may realize super multi-view 3D images without deteriorating the resolution.

Figure 5D:
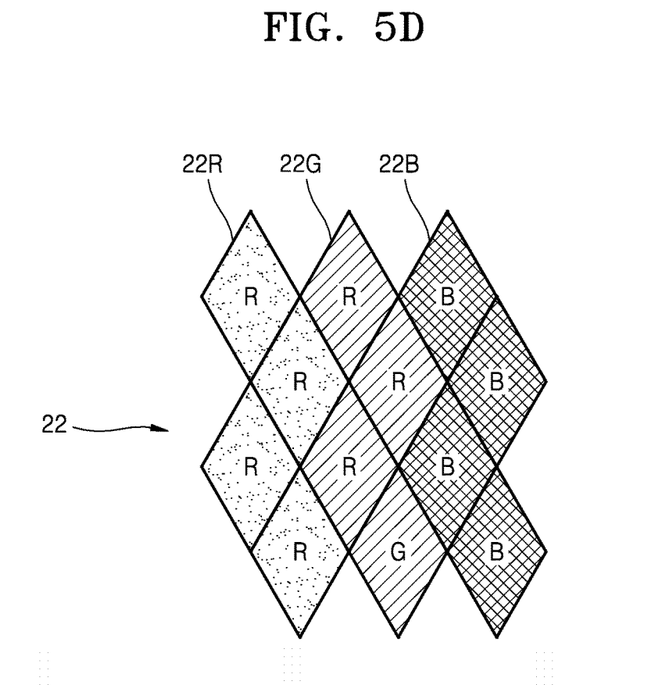

As illustrated in FIG. 5D, a display panel 22 of the image generation part 20 may have a plurality of color sub pixels 22R, 22G and 22B for displaying images, and the display panel 22 may be formed such that a plurality of the electrowetting prism cells 100 within the electrowetting prism device 40 correspond one to one with a plurality of the color sub pixels within the display panel 22. Namely, when the electrowetting prism cells 100 are arranged in a rhombic lattice form as described above, the color sub pixels of the display panel 22 may also be arranged in a rhombic lattice form. When the electrowetting prism cells 100 are arranged in a rectangular lattice form, the color sub pixels of the display panel 22 may also be arranged in a rectangular lattice form.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

Until now, illustrative embodiments for an electrowetting prism device and a multi-view 3D image display device have been described and illustrated in the drawings to aid in understanding the present disclosure. However, such embodiments are provided for illustrative purposes only, and the scope of the present disclosure should not be limited thereto in any manner. Further, it will be apparent to one of ordinary skill in the art that various changes in form and details may be made to these examples without departing from the spirit and scope of the claims and their equivalents. Therefore, the scope of the disclosure is defined not by the detailed description, but by the claims and their equivalents, and all variations within the scope of the claims and their equivalents are to be construed as being included in the disclosure.

Preparation of Exemplary Polarizable Liquids

Example 1

A polarizable liquid was prepared by mixing polyacrylic acid (PAA) (Sigma-Aldrich Corporation, having a molecular weight of 1800) and tetramethylammonium hydroxide (TMAH) (Sigma-Aldrich Corporation) having a weight ratio of 1:1 with ethylene glycol (EG) (Sigma-Aldrich Corporation) in an amount of 0.0014% by weight with respect to the weight of EG.

Example 2

A polarizable liquid was prepared by mixing PAA and TMAH having a weight ratio of 1:1 with EG in an amount of 0.014% by weight with respect to the weight of EG.

Example 3

A polarizable liquid was prepared by mixing PAA and TMAH having a weight ratio of 1:1 with EG in an amount of 0.14% by weight with respect to the weight of EG.

Example 4

A polarizable liquid was prepared by mixing PAA and TMAH having a weight ratio of 1:1 with EG in an amount of 1.4% by weight with respect to the weight of EG.

Example 5

A polarizable liquid was prepared by mixing PAA and TMAH having a weight ratio of 1:1 with EG in an amount of 3.0% by weight with respect to the weight of EG.

Comparative Example 1

A polarizable liquid was prepared by mixing PAA with EG in an amount of 0.00003% by weight with respect to the weight of EG.

Comparative Example 2

A polarizable liquid was prepared by mixing PAA with EG in an amount of 0.0003% by weight with respect to the weight of EG.

Comparative Example 3

A polarizable liquid was prepared by mixing PAA with EG in an amount of 0.003% by weight with respect to the weight of EG.

Comparative Example 4

A polarizable liquid was prepared by mixing PAA with EG in an amount of 0.03% by weight with respect to the weight of EG.

Comparative Example 5

A polarizable liquid was prepared by mixing PAA with EG in an amount of 0.3% by weight with respect to the weight of EG.

Comparative Example 6

A polarizable liquid was prepared by mixing PAA with EG in an amount of 2.5% by weight with respect to the weight of EG.

Figure 6:
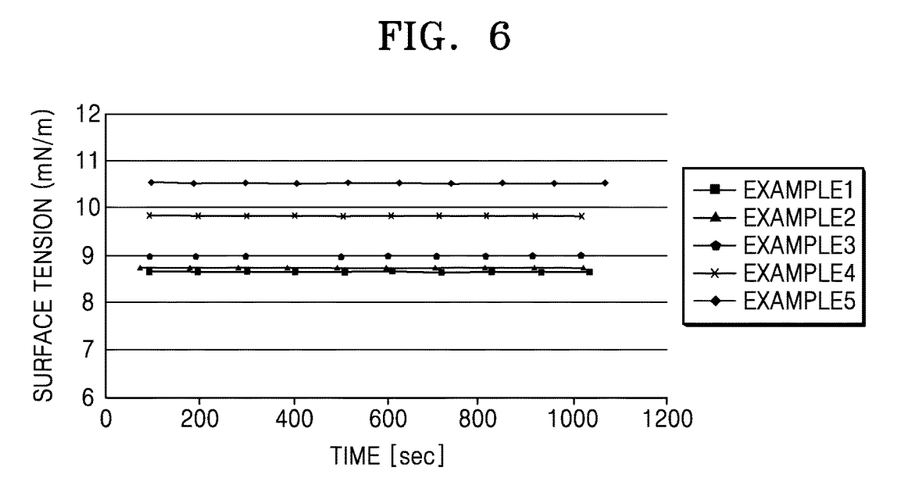
FIG. 6 is a graph illustrating surface tension values of polarizable liquids.

FIG. 6 is a graph illustrating measured surface tension values of the polarizable liquids of Examples 1 to 5. The surface tension values of the polarizable liquids were repeatedly measured every 100 seconds from 100 seconds to 1,000 seconds using a tensionmeter. Referring to FIG. 6, the greater the amounts of PAA and TMAH, the higher the surface tension values become. However, while the amounts of PAA and TMAH increase by as much as about 2,000 times from Example 1 (0.00014% by weight) to Example 5 (3% by weight), change amounts of the surface tension values are 2 mN/m. Therefore, it can be seen that changes in the surface tension values of the polarizable liquids are very small compared to content changes of PAA and TMAH.

Figure 7:
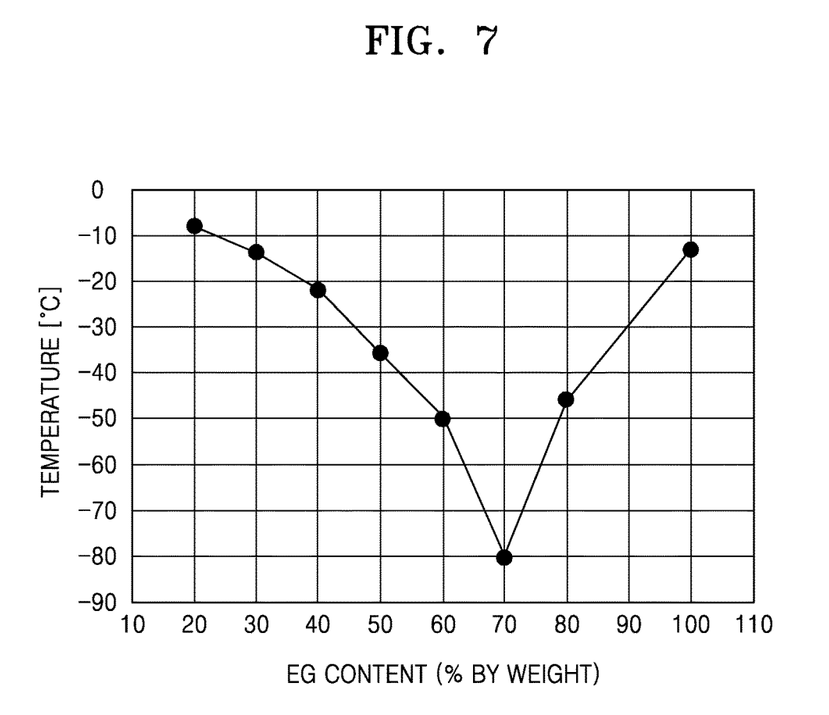
FIG. 7 is a graph illustrating freezing points of an aqueous ethylene glycol solution according to contents of ethylene glycol (EG)

FIG. 7 is a graph illustrating measured freezing points of an aqueous ethylene glycol solution according to EG weight content. Referring to FIG. 7, it can be seen that a freezing point of the aqueous ethylene glycol solution falls within a range of about −8° C. to about −80° C. according to the EG weight content. Therefore, the freezing point of the aqueous ethylene glycol solution is lower than that of water when EG is used as a solvent for the polarizable liquids.

Figure 8:
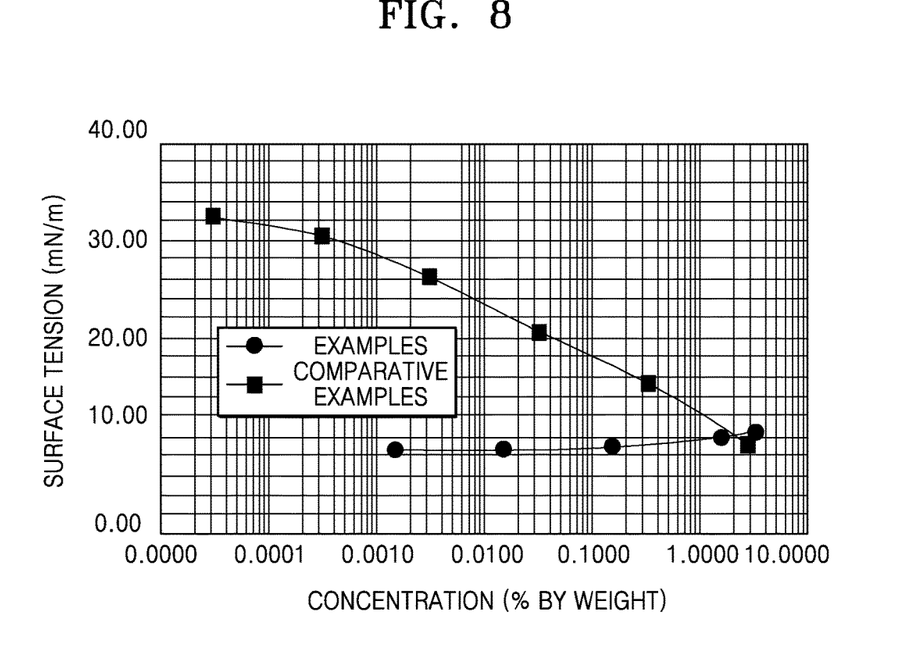
FIG. 8 is a graph illustrating surface tension values of Examples 1 to 5 and Comparative Examples 1 to 6.
Figure 9:
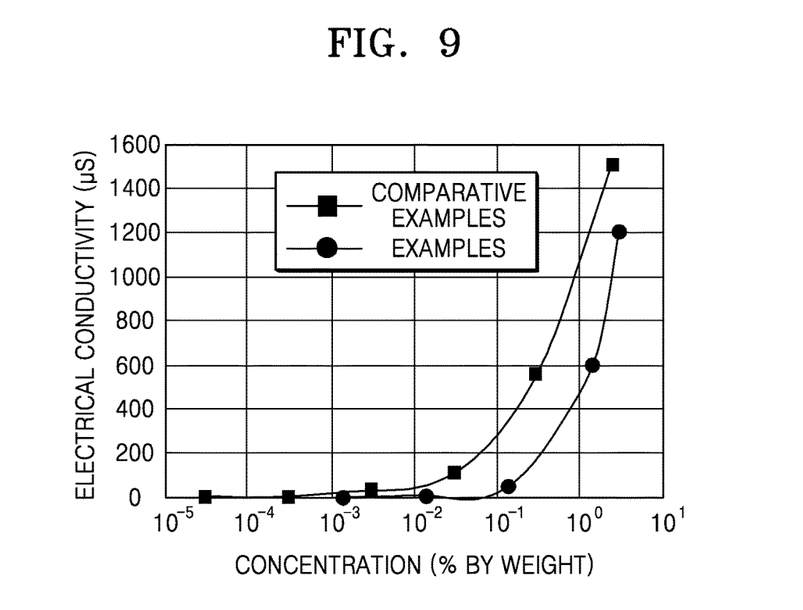
FIG. 9 is a graph illustrating electrical conductivity values of Examples 1 to 5 and Comparative Examples 1 to 6.

FIG. 8 is a graph illustrating measured surface tension values of polarizable liquids of Examples 1 to 5 and Comparative Examples 1 to 6, and FIG. 9 is a graph illustrating measured electrical conductivity values of polarizable liquids of Examples 1 to 5 and Comparative Examples 1 to 6. Further, the measured surface tension values and electrical conductivity values of the polarizable liquids of Examples 1 to 5 are represented in Table 1, and the measured surface tension values and electrical conductivity values of the polarizable liquids of Comparative Examples 1 to 6 are represented in Table 2.

TABLE 1

|  | PAA-TMAH (% by weight) | Surface tension (mN/m) | Electrical conductivity (µS/cm) |
| --- | --- | --- | --- |
| Example 1 | 0.0014 | 8.66 | 0.95 |
| Example 2 | 0.014 | 8.74 | 6.93 |
| Example 3 | 0.14 | 8.98 | 54.00 |
| Example 4 | 1.4 | 9.84 | 599.56 |
| Example 5 | 3.0 | 10.53 | 1202.44 |

TABLE 2

|  | PAA (% by weight) | Surface tension (mN/m) | Electrical conductivity (µS/cm) |
| --- | --- | --- | --- |
| Comparative Example 1 | 0.00003 | 32.43 | 3 |
| Comparative Example 2 | 0.0003 | 30.46 | 7 |
| Comparative Example 3 | 0.003 | 26.30 | 34.5 |
| Comparative Example 4 | 0.03 | 20.58 | 114 |
| Comparative Example 5 | 0.3 | 15.50 | 560 |
| Comparative Example 6 | 2.5 | 9.24 | 1510 |

Referring to Table 1, Table 2 and FIG. 8, it can be seen that, while there are high surface tension changes according to concentrations of PAA in the polarizable liquids of Comparative Examples 1 to 6, there are little surface tension changes according to concentrations of PAA and TMAH in the polarizable liquids of Examples 1 to 5.

Referring to Table 1, Table 2, FIG. 8 and FIG. 9, the polarizable liquids of Comparative Examples 2 to 6 have a surface tension change range of about 21 mN/m in a PAA concentration range of about 0.0003% by weight to about 2.5% by weight such that an electrical conductivity range of about 7 µS/cm to about 1,500 µS/cm can be obtained. On the other hand, the polarizable liquids of Examples 1 to 5 have a surface tension change range of about 2 mN/m in a PAA and TMAH concentration range of about 0.0014% by weight to about 3% by weight such that an electrical conductivity range of about 1 µS/cm to about 1,200 µS/cm can be obtained. It can be seen from this that the polarizable liquids of Comparative Examples 1 to 6 have higher electrical conductivity values with respect to the identical electrolyte concentration than those of the polarizable liquids of Examples 1 to 5. However, the polarizable liquids of Comparative Examples 1 to 6 have a very large surface tension change range according to the electrolyte concentration range compared to the polarizable liquids of Examples 1 to 5. It can be seen that the polarizable liquids of Examples 1 to 5 have a very small surface tension range in an electrolyte concentration range for obtaining an electrical conductivity range that is similar to that of the polarizable liquids of Comparative Examples 1 to 6. Therefore, the polarizable liquids of Examples 1 to 5 can control the electrical conductivity range in a wide electrolyte concentration range without changing the surface tension range.

Figure 10A:
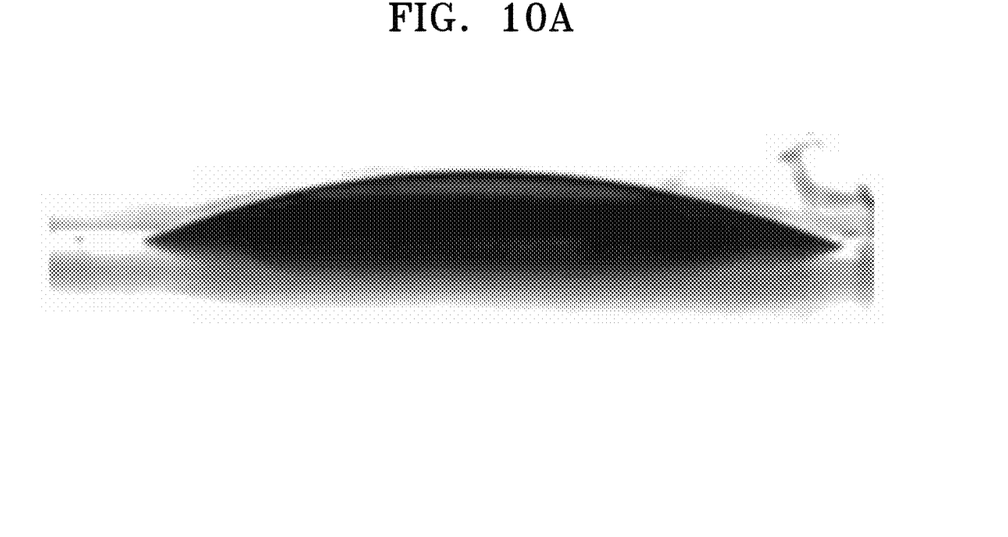
FIGS. 10A and 10B are illustrations of drops before and after applying a voltage to drops of the polarizable liquid of Example 5 on the surface of an electrode coated with a dielectric film.
Figure 10B:
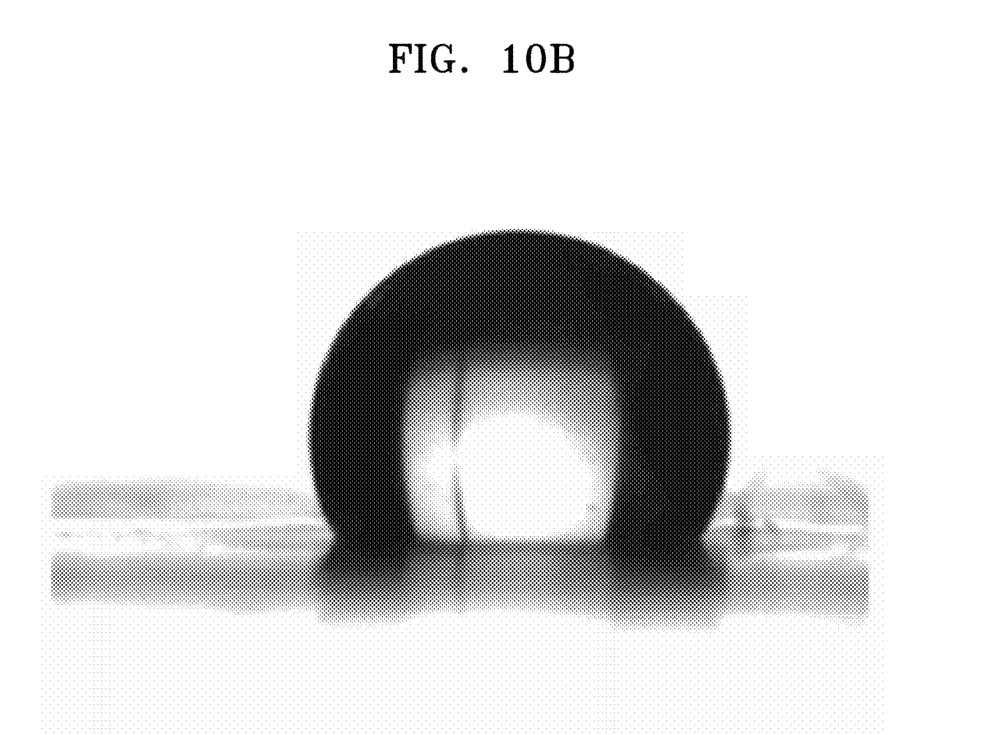

FIGS. 10A and 10B are images illustrating shapes of the drops before and after applying a voltage to the drops when drops of the polarizable liquid of Example 5 have been dropped onto the surface of an electrode coated with a dielectric film. An alternating current (AC) voltage of 40 V was applied at 1,000 Hz. Referring to FIGS. 10A and 10B, although drops of the polarizable liquids of Examples 1 to 5 maintain a water droplet shape in a state in which a voltage is not applied to the drops, wettability of the drops is increased in the voltage applied state to show the state in which the drops are widely spread on the hydrophilic surface.

Figure 11:
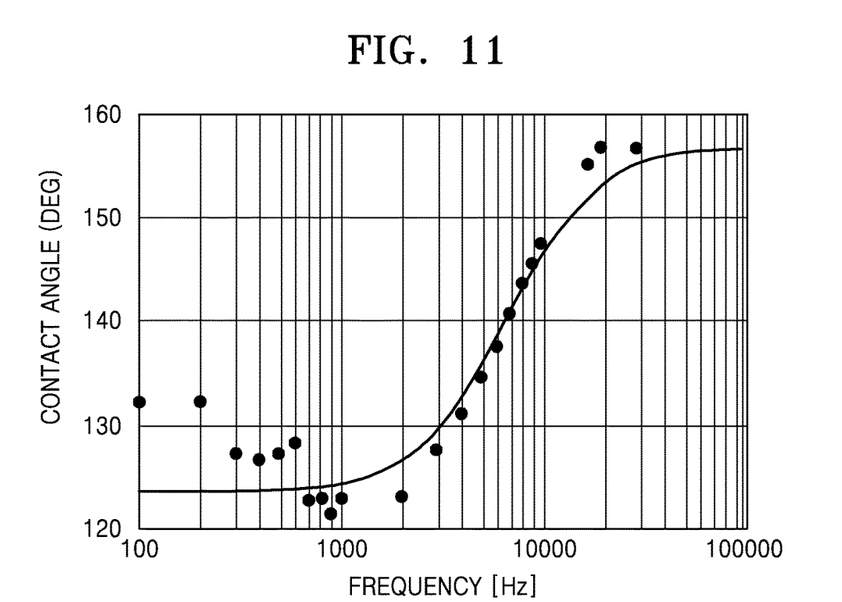
FIG. 11 is a graph illustrating contact angles of the drops according to a frequency of an applied signal.
Figure 12:
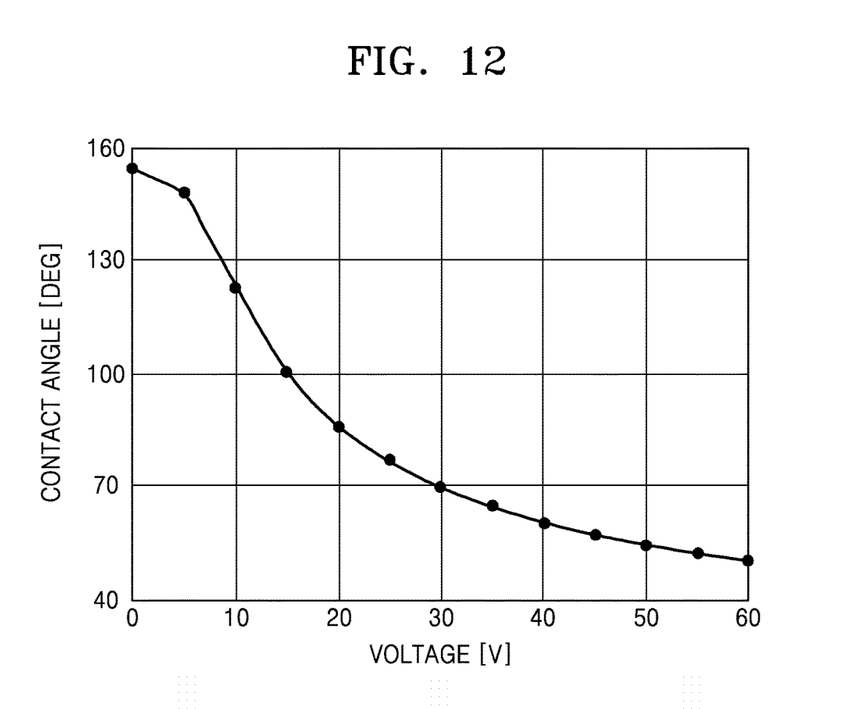
FIG. 12 is a graph illustrating contact angles of the drops according to a voltage level of an applied signal.

FIG. 11 and FIG. 12 are graphs illustrating measured contact angles of the drops while applying an AC voltage to the drops after dropping drops of the polarizable liquid of Example 5 onto the surface of an electrode coated with a dielectric film. FIG. 11 is a graph illustrating measured contact angles of the drops while varying a frequency at an applied voltage level (a maximum value) of 40 V. FIG. 12 is a graph in which measured contact angles of the drops with substrate surfaces are illustrated while fixing the frequency of an applied signal to 1 kHz and varying the voltage level of the applied signal.

Referring to FIG. 11 and FIG. 12, the contact angles increased as the frequency of the applied voltage increased, and the contact angles decreased as the applied voltage level increased. The contact angles varied between about 120° and about 160° while the frequency was between 100 Hz and 100,000 Hz at an applied voltage level of 40 V. The contact angles were between about 40° and about 160° while the applied voltage was between about 0 V and about 60 V at a frequency level of 1 kHz.

As described above, according to the one or more of the embodiments of the present disclosure, since the first fluid includes an organic acid and ammonium hydroxide having at least one alkyl group, the first fluid may maintain its electrical conductivity without leaking a current.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. A fluid for an electrowetting device, the fluid comprising:
   a polarizable liquid; and
   a nonpolar solution separated from the polarizable liquid by an interface,
   wherein the polarizable liquid comprises a polar solvent, an organic acid, and ammonium hydroxide having at least one alkyl group,
   wherein a weight of the organic acid with respect to a total weight of the polarizable liquid is 0.1% to 10%,
   wherein the polar solvent comprises ethylene glycol, 1,2-propylene glycol, 1,3-propylene glycol, diethylene glycol, propylene carbonate, diethyl carbonate, gamma-butyrolactone (GBL), dimethylformamide (DMF), N-methylpyrrolidone (NMP), or a mixture thereof, and
   wherein a weight ratio of the ammonium hydroxide having the at least one alkyl group to the organic acid is in a range of about 0.8 to about 1.2, and
      when the weight ratio is 1, the polarizable liquid has a first surface tension,
      when the weight ratio is 0.8, the polarizable liquid has a surface tension of about 50% of the first surface tension, and
      when the weight ratio is 1.2, the polarizable liquid has a surface tension of about 200% of the first surface tension.

2. The fluid of claim 1, wherein the organic acid comprises acetic acid, propionic acid, acrylic acid, lactic acid, isobutyric acid, tartaric acid, citric acid, cresol, phenol, polyacetic acid, polyacrylic acid, or a derivative thereof.

3. The fluid of claim 1, wherein the ammonium hydroxide having the at least one alkyl group comprises tetramethylammonium hydroxide, tetraethylammonium hydroxide, triethylmethylammonium hydroxide, diethyl dimethylammonium hydroxide, ethyltrimethylammonium hydroxide, or trimethylphenylammonium hydroxide.

4. The fluid of claim 1, wherein the nonpolar solution comprises oil.

5. The fluid of claim 1, wherein the polarizable liquid has an electrical conductivity of about 10 μS/cm to about 10,000 μS/cm.

6. The fluid of claim 1, wherein the polarizable liquid has a freezing point of about −5° C. to about −100° C.

7. The fluid of claim 1, wherein the polarizable liquid has a surface tension of about 6 mN/m to about 12 mN/m.

8. An electrowetting device comprising:
   a first electrode and a second electrode facing each other;
   a dielectric film formed on the first electrode and the second electrode; and
   a fluid for electrowetting disposed between the first electrode and the second electrode, and separated from the first electrode and the second electrode by the dielectric film,
   wherein the fluid for electrowetting comprises a polarizable liquid comprising a polar solvent, an organic acid, and ammonium hydroxide having at least one alkyl group, and a nonpolar solution separated from the polarizable liquid by an interface,
   wherein a weight of the organic acid with respect to a total weight of the polarizable liquid is 0.1% to 10%,
   wherein the polar solvent comprises ethylene glycol, 1,2-propylene glycol, 1,3-propylene glycol, diethylene glycol, propylene carbonate, diethyl carbonate, gamma-butyrolactone (GBL), dimethylformamide (DMF), N-methylpyrrolidone (NMP), or a mixture thereof, and
   wherein a weight ratio of the ammonium hydroxide having the at least one alkyl group to the organic acid is in a range of about 0.8 to about 1.2, and
      when the weight ratio is 1, the polarizable liquid has a first surface tension,
      when the weight ratio is 0.8, the polarizable liquid has a surface tension of about 50% of the first surface tension, and
      when the weight ratio is 1.2, the polarizable liquid has a surface tension of about 200% of the first surface tension.

9. The electrowetting device of claim 8, wherein the organic acid comprises acetic acid, propionic acid, acrylic acid, lactic acid, isobutyric acid, tartaric acid, citric acid, cresol, phenol, polyacetic acid, polyacrylic acid, or a derivative thereof.

10. The electrowetting device of claim 8, wherein the ammonium hydroxide having the at least one alkyl group comprises tetramethylammonium hydroxide, tetraethylammonium hydroxide, triethylmethylammonium hydroxide, diethyldimethylammonium hydroxide, ethyltrimethylammonium hydroxide, or trimethylphenylammonium hydroxide.

11. The electrowetting device of claim 8, wherein the nonpolar solution comprises oil.

12. The electrowetting device of claim 8, wherein signals are applied to the first and second electrodes to control a contact angle of the first fluid and the second fluid within a range of about 20° to about 160°.

13. An electrowetting cell comprising:
   a first electrode;
   a second electrode; and
   a fluid comprising a polarizable liquid and a nonpolar solution,
   wherein the polarizable liquid and the nonpolar solution are separated by an interface, the polarizable liquid comprises a polar solvent, an organic acid, and ammonium hydroxide having at least one alkyl group, and signals applied to the first and second electrodes control an incline angle of the interface, wherein a weight of the organic acid with respect to a total weight of the polarizable liquid is 0.1% to 10%, wherein the polar solvent comprises ethylene glycol, 1,2-propylene glycol, 1,3-propylene glycol, diethylene glycol, propylene carbonate, diethyl carbonate, gamma-butyrolactone (GBL), dimethylformamide (DMF), N-methylpyrrolidone (NMP), or a mixture thereof, and wherein a weight ratio of the ammonium hydroxide having the at least one alkyl group to the organic acid is in a range of about 0.8 to about 1.2, and when the weight ratio is 1, the polarizable liquid has a first surface tension, when the weight ratio is 0.8, the polarizable liquid has a surface tension of about 50% of the first surface tension, and when the weight ratio is 1.2, the polarizable liquid has a surface tension of about 200% of the first surface tension.

14. The fluid of claim 1, wherein the weight of the organic acid with respect to the total weight of the polarizable liquid is 0.1% to 3.0%.

* * * * *